March 31, 1931. H. PARKER 1,798,167
MULTIPLE CONDUIT
Filed Aug. 31, 1926 2 Sheets-Sheet 1
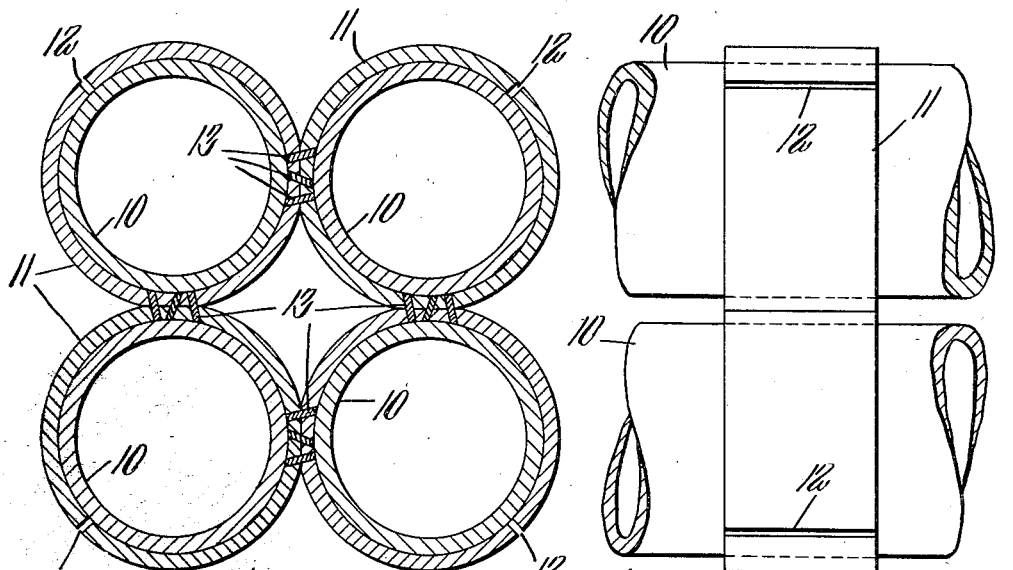
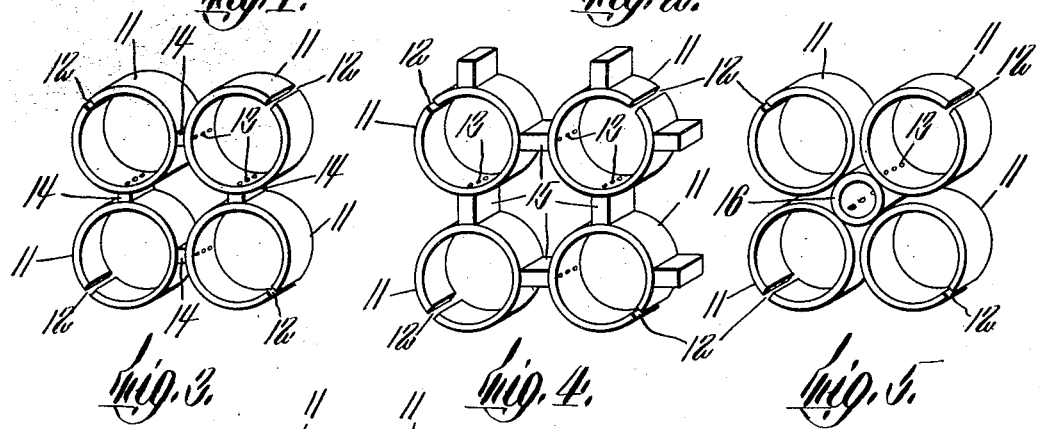
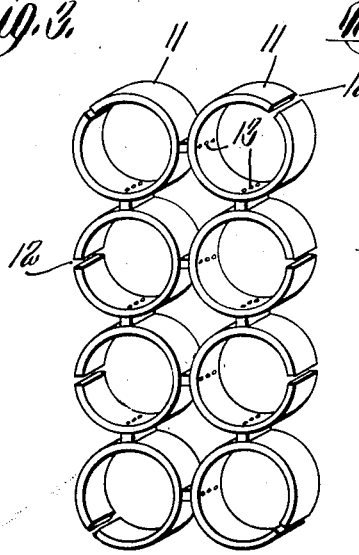
Inventor
Howard Parker Inventor
Howard Parker Patented Mar. 31, 1931

1,798,167

UNITED STATES PATENT OFFICE

HOWARD PARKER, OF BERLIN, NEW HAMPSHIRE, ASSIGNOR TO BROWN COMPANY, OF BERLIN, NEW HAMPSHIRE, A CORPORATION OF MAINE

MULTIPLE CONDUIT

Application filed August 31, 1926. Serial No. 132,675.

This invention relates to multiple conduit, that is, conduit comprising a plurality of separate, substantially parallel passages. It is frequently desired to run a number of separate conduits in a group for long distances. An object of this invention is to fill this want in a relatively efficient and inexpensive manner. The use of fiber conduit, impregnated with asphalt, pitch or equivalent waterproofing compound, for carrying electric wires for various purposes, or fluids of various kinds, has become established. Conduit of this type offers advantages of light weight, cheapness and strength. It is easily machined so that water-tight joints are readily made. Where it is desired to run several conduits of this type in a group, the laying of the conduit piece by piece, building up the group from single sections of conduit, and securing the lines of conduit together with spacers and bonds, involve the handling of a great many separate pieces and results in unnecessarily high laying costs. By my invention I provide means for uniting lengths of fiber conduit into groups to facilitate the laying of multiple conduit by reducing materially the number of separate articles (including sections of conduit, spacers and bonds) which have to be handled. I am aware that tile or vitrified clay conduit is made having multiple passages therein, but such conduit is expensive, heavy, frangible and unsuitable for certain purposes such as carrying fluids or electric power lines. Such conduit is unsuitable for carrying fluids because of the practical impossibility of making the joints between consecutive sections tight so as to keep the various passages in the conduit from leaking into one another. It has been found unsuitable for electric power transmission lines since abnormal conditions which may occur in one of the lines so as to cause excessive heating are liable to fuse the walls of the conduit and thus short circuit all the lines in the group. These difficulties may be overcome by using fiber conduit as a kind of core mold, filling in around it with concrete. Such a combination is economical since the heavy concrete materials may be obtained locally, thus minimizing transportation and handling costs. Furthermore, the various conduits when laid are separated by concrete which will not break down under high heat but localizes trouble in electric power lines to the line where the trouble begins, and prevents the failure of the rest of the lines. The joints between successive lengths of such conduit are also readily made watertight. My invention also provides a method of alining the conduits where two or more groups are laid together.

Further novel and advantageous features will be apparent from the disclosure of the invention in the following description and on the drawings, of which,—

Figure 1 is a sectional view of a typical multiple conduit unit.

Figure 2 is a fragmentary elevation of the same.

Figures 3, 4 and 5 are perspectives of various forms of the tie members used in making multiple conduit.

Figure 6 illustrates a tie member for combining eight conduits in a multiple unit.

Figure 7:
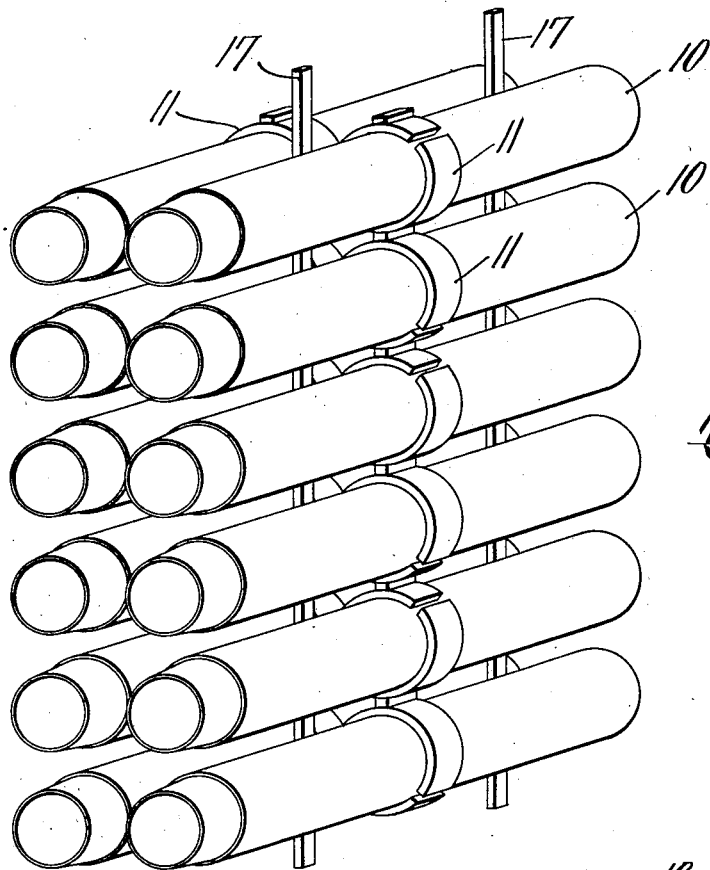
Figure 7 is a perspective view of a number of multiple units placed one over the other and vertically alined with battens.

Referring to the drawings in detail, 10 represents a section of conduit which may be of any desired material, but which for the purposes of this invention is preferably of fibrous material such as wood, or wood pulp, or laminated paper tubing. In particular a preferred form is fiber tubing having a relatively hard homogeneous wall structure produced by rolling up a sheet of wet pulp under such conditions as to cause the layers to interfelt. Such conduit is capable of being waterproofed by being impregnated with pitch, asphalt or other equivalent waterproofing material, the finished conduit being relatively light, strong and inexpensive.

A number of such conduits may be assembled into a multiple unit as by tie members such as are, for example, illustrated in Figures 3, 4, 5 and 6. The tie members illustrated comprise essentially a plurality of collars 11, there being one such collar in a tie member for each conduit in the multiple unit. The collars 11 are preferably split as at 12 and are of stiff material which, however, should have a certain amount of resilience so that the relative sizes of the conduit and the collar may be such as to cause a resilient gripping engagement of the conduit by the collar.

In the tie members used for holding in assembled position wood fiber conduit, such as is described above, I prefer to use as material therefor cellulose fiber which may be of the same kind as that used for the conduit. For this purpose I may use short lengths cut from a conduit of the next larger size, the larger conduit having an internal diameter preferably equal to or slightly less than the external diameter of the conduit to be assembled; thus an economy in manufacturing operations may be effected by utilizing the good portions of defective conduit in tie members for a conduit the next size smaller.

The collars 11 may be fastened together by any suitable means, such as, for example, nails, screws, rivets, clips, strands, or the like. An adhesive may also be used. In making tie members of fiber collars, I prefer to use wooden pegs 13 which may be driven through the contiguous portions of the walls of adjacent collars. Figure 1 shows four collars assembled thus in direct contact with each other. The conduits in this case are thus separated by a distance to or slightly less than twice the thickness of the wall of the collars 11. Such a multiple unit is useful for certain purposes, but where it is desired to fill in around conduits with concrete it may be preferable to space the conduits further from each other in order to allow freer access for concrete. For this purpose spacers may be supplied, as shown in Figures 3, 4 and 5, of any convenient material, these spacers being of any desired magnitude. In Figure 3, for example, spacers 14 of relatively thin material are inserted between each pair of adjacent collars 11 and are secured in place as by pegs 13, or any other suitable fastening devices. In some cases the kind of material chosen for spacers may be governed by a particular use to which the conduit is to be put. For example, for electric power cables, the spacers should be of material with high heat resistant qualities, such as cement or concrete members which may be molded in position between collars 11.

Figure 4 illustrates four collars assembled with wider spacing members 15, additional spacers being shown as attached on the top of the upper collars and on one side of the tie member. These top and side spacers serve to facilitate the uniform spacing of conduit where a number of multiple units are used together in superposed or side-by-side relation.

Figure 5 illustrates an alternative form consisting of a short length of tube 16, preferably of smaller size than the collars 11, the collars being separately fastened to the central tube 16 and arranged around it cylindrically.

Figure 6 illustrates a multiple unit consisting of eight collars assembled with spacers as in the form shown in Figure 3. Any desired number of collars may be thus assembled, the collars being preferably arranged in not more than two rows in order to permit resilient expansion of each collar.

Figure 7 illustrates a method of arranging or alining a number of multiple units. Where it is desired to run a considerable number of conduits in a single group, this group may be built up of a plurality of multiple units of four conduits each, held together by tie members as illustrated in Figure 4, for example, or units of larger numbers of conduits may be assembled. For example, the twelve conduits illustrated in Figure 7 may comprise three units of four, or one unit of eight and another unit of four, or six units of two, or any other convenient combination according to the stock which may happen to be on hand. In alining a plurality of multiple units, either vertically as shown in Figure 7 or horizontally, suitable battens 17 may be thrust down between the conduits in the two rows, these battens being of a thickness to fit snugly between the conduits of adjacent rows. The battens not only facilitate the joining of the ends of the conduits to the complementary ends of the conduits in the next successive length of the system, but also hold the units firmly in place while the concrete is poured between and around the conduits and tamped into place.

Figure 8:
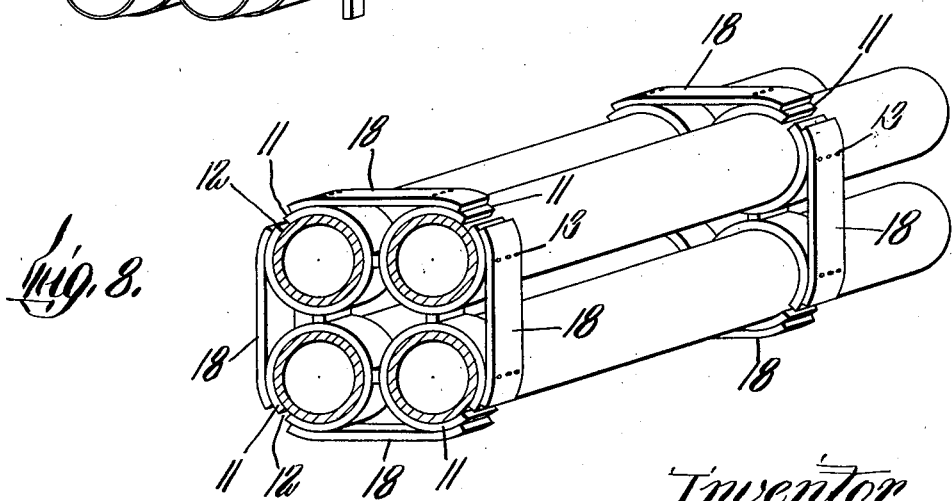
Figure 8 is a multiple conduit unit showing a further modified form of tie member.

A modified form of tie member is illustrated in Figure 8, this form being similar to that illustrated in Figure 3, but having in addition thereto reinforcing bonds 18 of suitable material, such, for example, the same as that of which the collars 11 are composed, these reinforcing members being secured to the collars 11 by any suitable fastening means 13.

Although the spring gripping engagement of the collars 11 is sufficient to hold the conduits 10 in place so as to permit ordinary handling of the multiple units without disarranging the conduits therein, I prefer in some cases to secure the conduits individually to the collars about them by adhesives, or fastening means of any kind, or both.

In order to render the whole multiple unit waterproof the conduit and the tie members may be impregnated with waterproofing material at any desired stage of manufacture, but ordinarily I prefer to impregnate the single conduit lengths separately, to construct each tie member by fastening together the collars 11 with or without spaces 14 before impregnation, then to saturate the whole tie member with waterproofing material, and lastly to insert the conduit lengths and secure the tie members thereto. I do not limit myself, however, to this particular sequence of steps.

In assembling the multiple units, the number of tie members used for each unit will ordinarily depend upon the length of conduit. For convenience in laying, I find it desirable to make the conduit in lengths which are multiples of a two foot unit length. One tie member is found to suffice for the two foot lengths while two tie members are preferable for the four foot lengths, an additional tie member being preferably used for each additional two feet on the length of the conduit. This spacing of the tie members affords a rigidity of structure which will enable thorough tamping of concrete about and between the conduits without danger of springing them away from each other or otherwise displacing them.

The size of the spacing blocks 14, 15 is preferably determined by the type of concrete which it is desired to use, the coarser or drier the concrete the wider the spaces must be in order to permit thorough tamping to avoid the possibility of air holes or vents in the concrete structure.

Having thus described certain embodiments of my invention, it should be evident to those skilled in the art that many changes and modifications might be made therein without departing from its spirit or scope as defined by the appended claims.

I claim:

1. A multiple conduit section comprising a plurality of lengths of single conduit, and means for holding said lengths together in parallel relation, said means comprising collars to receive the lengths, spacers between adjacent collars, and means securing the collars to the spacers.

2. A multiple-conduit tie member comprising a plurality of fibrous collars each adapted to receive a single conduit, said collars being arranged in a double row, and means for holding the collars in fixed relative position, comprising spacing members fastened between adjacent collars.

3. A multiple-conduit tie member comprising a plurality of longitudinally split fibrous collars, each adapted for resilient engagement about a single conduit, said collars being arranged in parallel rows, and means for holding said collars in fixed relative position, said holding means comprising spacing blocks between adjacent collars and pegs passing through the wall of each collar and into a block.

4. A multiple fiber conduit section comprising a plurality of single lengths of fiber conduit arranged in parallel relation, a fiber collar encircling each conduit, means for holding said collars in fixed relative positions, said holding means comprising spacing members and fastened means securing the collars and spacing members to each other, and a waterproofing compound permeating said conduits and collars and cementing them to each other.

5. In combination, a plurality of multiple-conduit units, each unit comprising a double row of single conduits in spaced parallel relation, and a batten extending through the space between the rows of conduits in the multiple units and fitting snugly between each pair of conduits in said rows.

In testimony whereof I have affixed my signature.

HOWARD PARKER.